(12) United States Patent
Kondo et al.

(10) Patent No.: US 8,040,409 B2
(45) Date of Patent: Oct. 18, 2011

(54) IMAGE PROCESSING DEVICE CAPABLE OF PERFORMING RETINEX PROCESS AT HIGH SPEED

(75) Inventors: Masaki Kondo, Aichi-ken (JP); Tomohiko Hasegawa, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 1005 days.

(21) Appl. No.: 11/931,213

(22) Filed: Oct. 31, 2007

(65) Prior Publication Data

US 2008/0100749 A1 May 1, 2008

(30) Foreign Application Priority Data

Oct. 31, 2006 (JP) ................. 2006-296904

(51) Int. Cl.
*H04N 5/202* (2006.01)
*H04N 9/68* (2006.01)
(52) U.S. Cl. ........................ 348/254; 348/234
(58) Field of Classification Search .................. 348/254, 348/673, 234
See application file for complete search history.

(56) References Cited

U.S. PATENT DOCUMENTS

| | | | |
|---|---|---|---|
| 6,885,482 B1 | 4/2005 | Kubo et al. | |
| 7,548,258 B2 * | 6/2009 | Kaplinsky | 348/211.99 |
| 7,683,948 B2 * | 3/2010 | Yanof et al. | 348/246 |
| 2003/0071923 A1 * | 4/2003 | Eskin | 348/674 |
| 2004/0091164 A1 | 5/2004 | Sakatani et al. | |
| 2005/0134711 A1 * | 6/2005 | Hori | 348/254 |
| 2006/0221226 A1 * | 10/2006 | Yanof et al. | 348/346 |

FOREIGN PATENT DOCUMENTS

| | | |
|---|---|---|
| JP | 2001-69525 | 3/2001 |
| JP | 2003-333331 | 11/2003 |
| JP | 2004-164121 | 6/2004 |
| JP | 2004-165840 | 6/2004 |
| JP | 2005-4506 | 1/2005 |
| JP | 2005-4510 | 1/2005 |
| JP | 3731577 | 10/2005 |

\* cited by examiner

*Primary Examiner* — Lin Ye
*Assistant Examiner* — Amy Hsu
(74) *Attorney, Agent, or Firm* — Scully, Scott, Murphy & Presser, P.C.

(57) ABSTRACT

A storage portion stores, in association with first pixel values, table values including either gamma-corrected values obtained by performing gamma correction on the first pixel values using a predetermined reflectance component or second pixel values calculated based both on the gamma-corrected values and on the first pixel values. A pixel-value generating portion includes an extracting portion and a determining portion. The extracting portion extracts at least one of the table values corresponding to a pixel value of a subject pixel. The determining portion determines a pixel value of an output image based on the at least one of the table values extracted by the extracting portion. The predetermined reflectance component is the reflectance component calculated by the reflectance-component calculating portion when the pixel value of the subject pixel is substantially identical with the average luminance of the peripheral pixels.

6 Claims, 6 Drawing Sheets

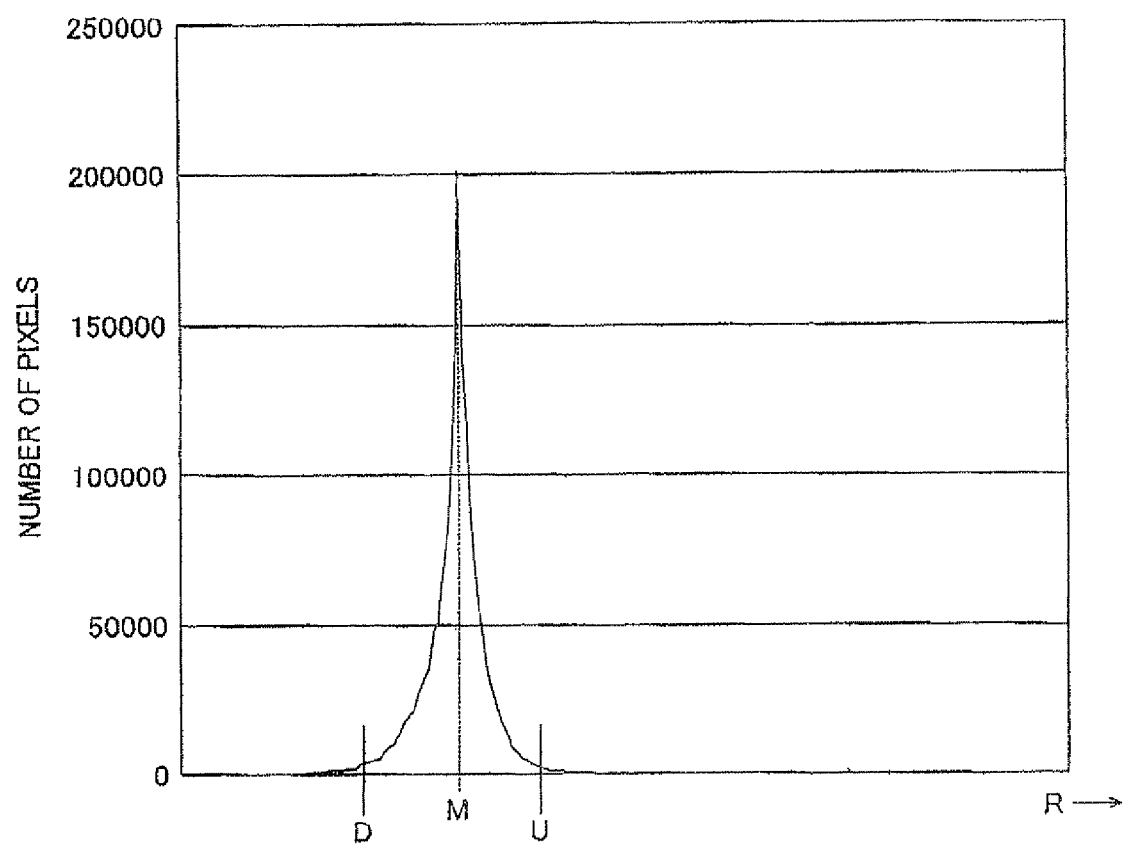

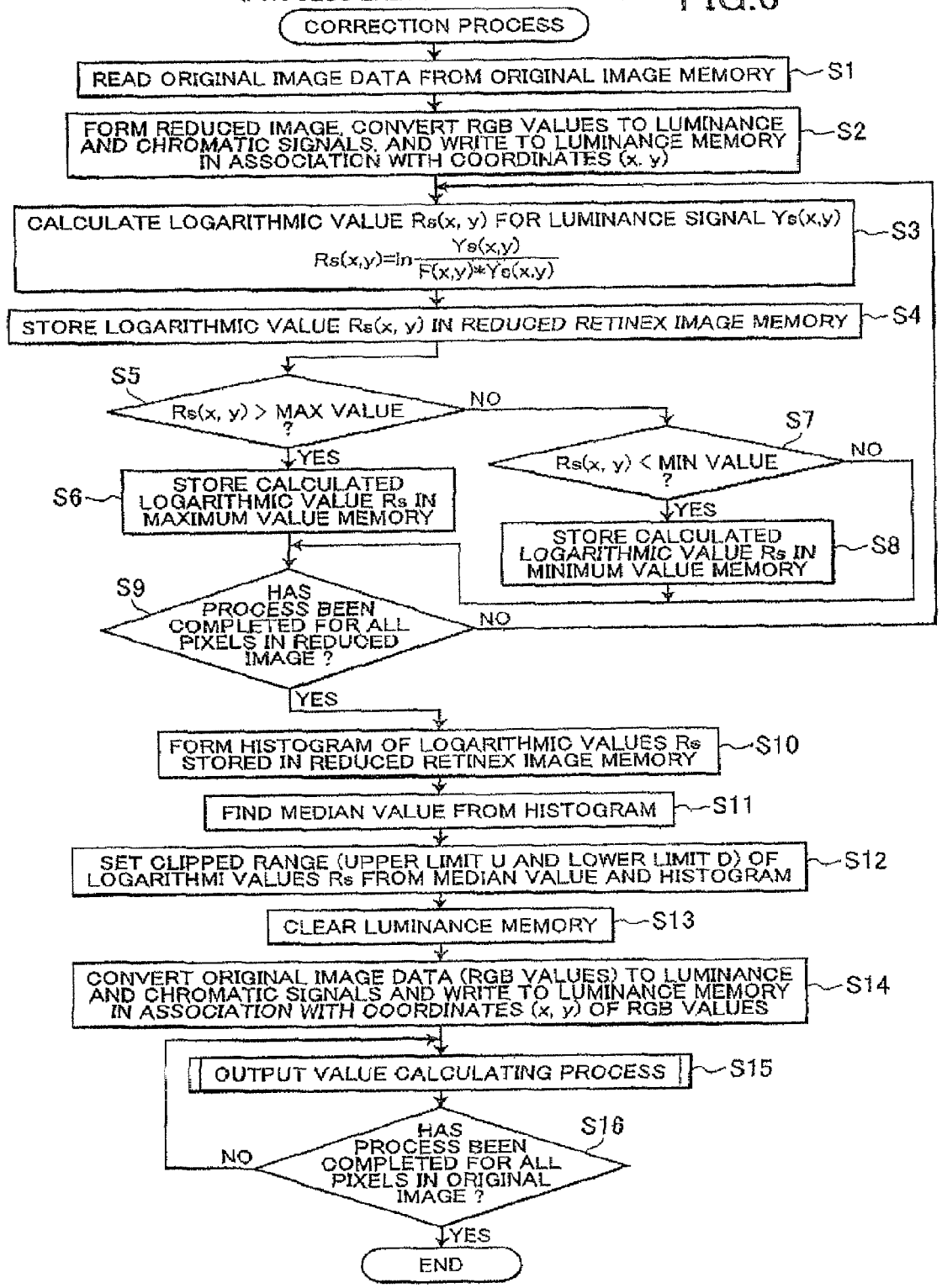

IMAGE PROCESSING DEVICE CAPABLE OF PERFORMING RETINEX PROCESS AT HIGH SPEED

CROSS REFERENCE TO RELATED APPLICATIONS

This application claims priority from Japanese Patent Application No. 2006-296904 filed Oct. 31, 2006. The entire content of the priority application is incorporated herein by reference.

TECHNICAL FIELD

The invention relates to an image processing device and a storage medium storing an image processing program, and more specifically to an image processing device and a storage medium storing an image processing program that performs a Retinex process on an image.

BACKGROUND

When taking a photograph of a subject under backlit conditions, e.g. against the sun, the image of the subject portion is an indistinct backlit image with low lightness and contrast, making it difficult to make out details of the subject. Image processing is performed to improve the quality of these backlit images, as well as images suffering in quality due to overexposure, underexposure, blurring due to jiggling when capturing the image, noise, insufficient light, and the like, in order to improve lightness and contrast in the image. One method used in conventional image processing is a Retinex process.

As disclosed in U.S. Patent Application Publication No. 2004/0091164 (corresponding to Japanese Patent No. 3,731, 577), the Retinex process is performed to correct lightness and contrast, such as gamma correction of illumination components. The Retinex process can produce an output image with improved image quality for low-quality regions of the input image, such as backlit regions.

SUMMARY

However, since the conventional method described above includes gamma correction calculations, there arises a problem that it requires a long time to generate output values. That is, the gamma correction calculations include complicated calculation process and require a large number of calculations. In addition, an image (input image) includes a large number of pixels. Thus, if the output value for each pixel is calculated according to a gamma correction expression, it leads to an increased processing time (i.e., deteriorated processing speed).

In view of the foregoing, it is an object of the invention to provide an image processing device capable of performing a Retinex process at a high speed, and a storage medium for storing an image processing program capable of performing a Retinex process at a high speed.

In order to attain the above and other objects, the invention provides an image processing device. The image processing device includes a reflectance-component calculating portion, a pixel-value generating portion, and a storage portion. The reflectance-component calculating portion calculates a reflectance component based both on a pixel value of a subject pixel in an original image and on an average luminance of peripheral (surround) pixels around the subject pixel. The reflectance component is indicative of brightness of the subject pixel relative to the peripheral pixels. The pixel-value generating portion generates a pixel value of an output image based both on the pixel value of the subject pixel and on a corrected value obtained by performing gamma correction on the pixel value of the subject pixel using the reflectance component. The storage portion stores, in association with first pixel values, table values including either gamma-corrected values obtained by performing gamma correction on the first pixel values using a predetermined reflectance component or second pixel values calculated based both on the gamma-corrected values and on the first pixel values. The pixel-value generating portion includes an extracting portion and a determining portion. The extracting portion extracts at least one of the table values corresponding to the pixel value of the subject pixel. The determining portion determines the pixel value of the output image based on the at least one of the table values extracted by the extracting portion. The predetermined reflectance component is the reflectance component calculated by the reflectance-component calculating portion when the pixel value of the subject pixel is substantially identical with the average luminance of the peripheral pixels.

According to another aspect, the invention also provides an image processing device. The image processing device includes a reflectance-component calculating portion, a pixel-value generating portion, and a storage portion. The reflectance-component calculating portion calculates a reflectance component based both on a pixel value of a subject pixel in an original image and on an average luminance of peripheral pixels around the subject pixel. The reflectance component is indicative of brightness of the subject pixel relative to the peripheral pixels. The pixel-value generating portion generates a pixel value of an output image based both on the pixel value of the subject pixel and on a corrected value obtained by performing gamma correction on the pixel value of the subject pixel using the reflectance component. The storage portion stores, in association with first pixel values, table values including either gamma-corrected values obtained by performing gamma correction on the first pixel values using a predetermined reflectance component or second pixel values calculated based both on the gamma-corrected values and on the first pixel values. The pixel-value generating portion includes a range setting portion, a normalizing portion, an extracting portion, and a determining portion. The range setting portion sets a range of normalization for the reflectance component calculated by the reflectance-component calculating portion. The range of normalization includes a number of pixels greater than or equal to a predetermined ratio. The normalizing portion normalizes the reflectance component within the range of normalization based on conversion from the range of normalization set by the range setting portion to another range defined by predetermined upper and lower limits, thereby calculating a normalized reflectance component. The extracting portion extracts at least one of the table values corresponding to the pixel value of the subject pixel. The determining portion determines the pixel value of the output image based on the at least one of the table values extracted by the extracting portion. The pixel-value generating portion generates the pixel value of the output image using the normalized reflectance component as the reflectance component. The predetermined reflectance component used for obtaining the gamma corrected values includes one of an average value, a median value, and a mode value of the normalized reflectance component.

According to still anther aspect, the invention also provides a storage medium storing a set of program instructions executable on an image processing device. The set of program instructions includes: calculating a reflectance component based both on a pixel value of a subject pixel in an original image and on an average luminance of peripheral pixels around the subject pixel, the reflectance component being indicative of brightness of the subject pixel relative to the peripheral pixels; and generating a pixel value of an output image based both on the pixel value of the subject pixel and on a corrected value obtained by performing gamma correction on the pixel value of the subject pixel using the reflectance component. The generating instructions include: extracting at least one of table values corresponding to the pixel value of the subject pixel, the table values being stored in association with first pixel values in a storage portion, the table values including either gamma-corrected values obtained by performing gamma correction on the first pixel values using a predetermined reflectance component or second pixel values calculated based both on the gamma-corrected values and on the first pixel values; and determining the pixel value of the output image based on the at least one of the table values extracted by the extracting instructions. The predetermined reflectance component is the reflectance component calculated by the calculating instructions when the pixel value of the subject pixel is substantially identical with the average luminance of the peripheral pixels.

According to still another aspect, the invention also provides a storage medium storing a set of program instructions executable on an image processing device. The set of program instructions includes: calculating a reflectance component based both on a pixel value of a subject pixel in an original image and on an average luminance of peripheral pixels around the subject pixel, the reflectance component being indicative of brightness of the subject pixel relative to the peripheral pixels; and generating a pixel value of an output image based both on the pixel value of the subject pixel and on a corrected value obtained by performing gamma correction on the pixel value of the subject pixel using the reflectance component. The generating instructions include: setting a range of normalization for the reflectance component calculated by the calculating instructions, the range of normalization including a number of pixels greater than or equal to a predetermined ratio; normalizing the reflectance component within the range of normalization based on conversion from the range of normalization set by the setting instructions to another range defined by predetermined upper and lower limits, thereby calculating a normalized reflectance component; extracting at least one of table values corresponding to the pixel value of the subject pixel, the table values being stored in association with first pixel values in a storage portion, the table values including either gamma-corrected values obtained by performing gamma correction on the first pixel values using a predetermined reflectance component or second pixel values calculated based both on the gamma-corrected values and on the first pixel values; and determining the pixel value of the output image based on the at least one of the table values extracted by the extracting instructions. The generating instructions include generating the pixel value of the output image using the normalized reflectance component as the reflectance component. The predetermined reflectance component used for obtaining the gamma corrected values includes one of an average value, a median value, and a mode value of the normalized reflectance component.

BRIEF DESCRIPTION OF THE DRAWINGS

Embodiments in accordance with the invention will be described in detail with reference to the following figures wherein:

FIG. 5 is a histogram of logarithmic values for a typical image, such as the image shown in FIGS. 4A and 4B;

FIG. 6 is a flowchart illustrating steps in a correction process performed according to the image processing program in the printer.

DETAILED DESCRIPTION

Figure 1:
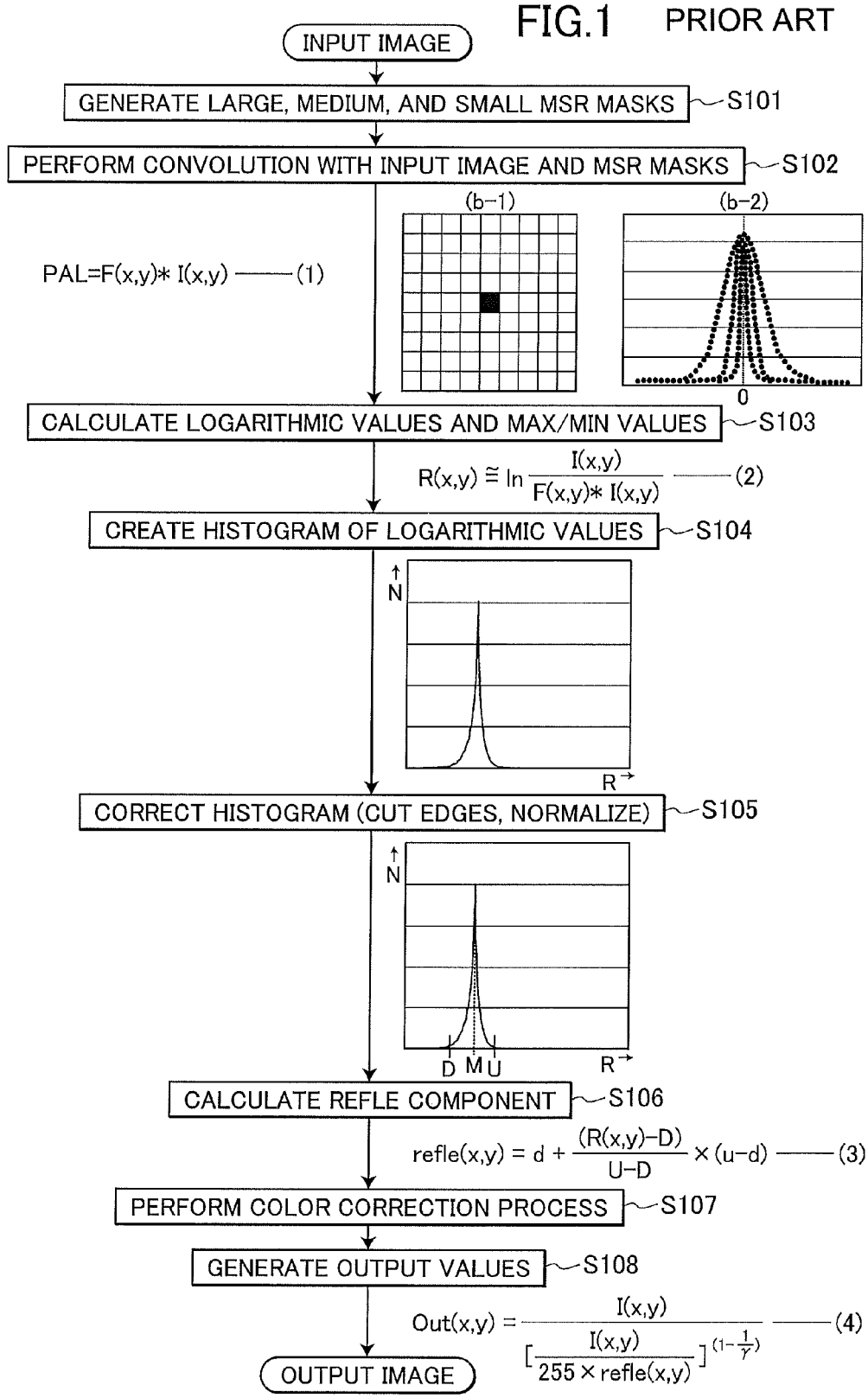
FIG. 1 is a flowchart illustrating the overall steps of a Retinex process.

First, a common Retinex process will be described briefly with reference to FIG. 1. In S101 and S102 of the Retinex process, a process using Gaussian filters (MSR masks) conforming to equation (1) is performed with each pixel in the input image (original image) set as the target pixel. The diagram (b-1) in FIG. 1 conceptually illustrates a Gaussian filter formed of an m×n matrix. The diagram (b-2) in FIG. 1 indicates filter coefficients set in each matrix constituting the Gaussian filters. In the graph (b-2) of FIG. 1, the horizontal axis denotes the position in the matrix (filter size), while the vertical axis denotes the filter coefficient. The value "0" indicated near the center of the horizontal axis is the center position of the filter. Positions farther away from "0" indicate matrix positions farther from the filter center. As shown in (b-2) in FIG. 1, the Gaussian filter is designed so that the filter coefficients grow gradually smaller in all four directions from the center, while the sum of filter coefficients is 1.

$$PAL = F(x,y) * I(x,y) \qquad \text{Equation (1)}$$

Here, PAL denotes the peripheral (surround) average luminance, x the horizontal coordinate, y the vertical coordinate, I(x, y) the signal intensity at the coordinate (x, y) (pixel value or value of the pixel signal), F(x, y) the Gaussian filter, and "*" the convolution operation. The Gaussian filter process, which is a convolution operation performed with a Gaussian filter F(x, y) in m×n regions for each pixel set as the target pixel, calculates the average luminance of pixel values averaged while adding weight to peripheral pixels based on the distance from the target pixel for each pixel. The average luminance of peripheral pixels calculated according to the Gaussian filter process reflects the values of peripheral pixels in the value of the target pixel.

In S103 each pixel value in the input image is divided by the corresponding average luminance calculated above according to equation (2), and the acquired value is converted to a logarithmic value.

$$R(x, y) \equiv \ln \frac{I(x, y)}{F(x, y) * I(x, y)} \qquad \text{Equation (2)}$$

R is the logarithmic value found from the above equation. A logarithmic value R(x, y) is found for each pixel value. When finding these logarithmic values R, maximum and minimum values of the logarithmic values R are found in order to generate a histogram of the logarithmic values R.

In S104 a histogram (frequency distribution) of logarithmic values R is created within the range set by the maximum and minimum values, and the histogram is subsequently corrected in S105. To correct the histogram, a median value M is found from the histogram generated above, U is set to the upper limit of a range including a predetermined percentage (45%, for example) of pixels greater than the median value M, and D is set to the lower limit of a range including a predetermined percentage (45%, for example) of pixels less than the median value M.

In S106 a normalized reflectance value (normalized Retinex value) refle is found by normalizing the logarithmic values R. Specifically, the values of the upper limit U and lower limit D found above are set as a predetermined upper limit u and lower limit d, and the logarithmic values R within the range between the upper limit U and lower limit D are normalized to value within a range between the upper limit u and the lower limit d (i.e., the normalized reflectance values refle are calculated). This normalization is performed using equation (3), for example.

$$refle(x, y) = d + \frac{(R(x, y) - D)}{U - D} \times (u - d) \qquad \text{Equation (3)}$$

The normalized reflectance values refle found above are the reflected light components of the input image (the normalized reflected light components) and serve as parameters for finding the final reflected light components (output values Out). In S107 a color correction process, or CR process, is executed on the normalized reflectance values refle to generate output values Out. In S108 the output values Out are calculated according to equation (4) below. These output values Out are the values of pixels in the output image (output image data).

$$Out(x, y) = \frac{I(x, y)}{\left(\frac{I(x, y)}{255 \times refle(x, y)}\right)^{(1 - \frac{1}{\gamma})}} \qquad \text{Equation (4)}$$

Pixel values in the Retinex process are values combining the illumination component and the reflected light component, where the illumination component reflects luminance and the reflected light component reflects color. Since the illumination component is found by dividing the pixel value of the input image by the reflected light component, the denominator in equation (4) corresponds to the illumination component. The normalized reflectance values refle(x, y) is multiplied by 255 since pixel values in the input image are expressed as values between 0 and 255.

Figure 2:
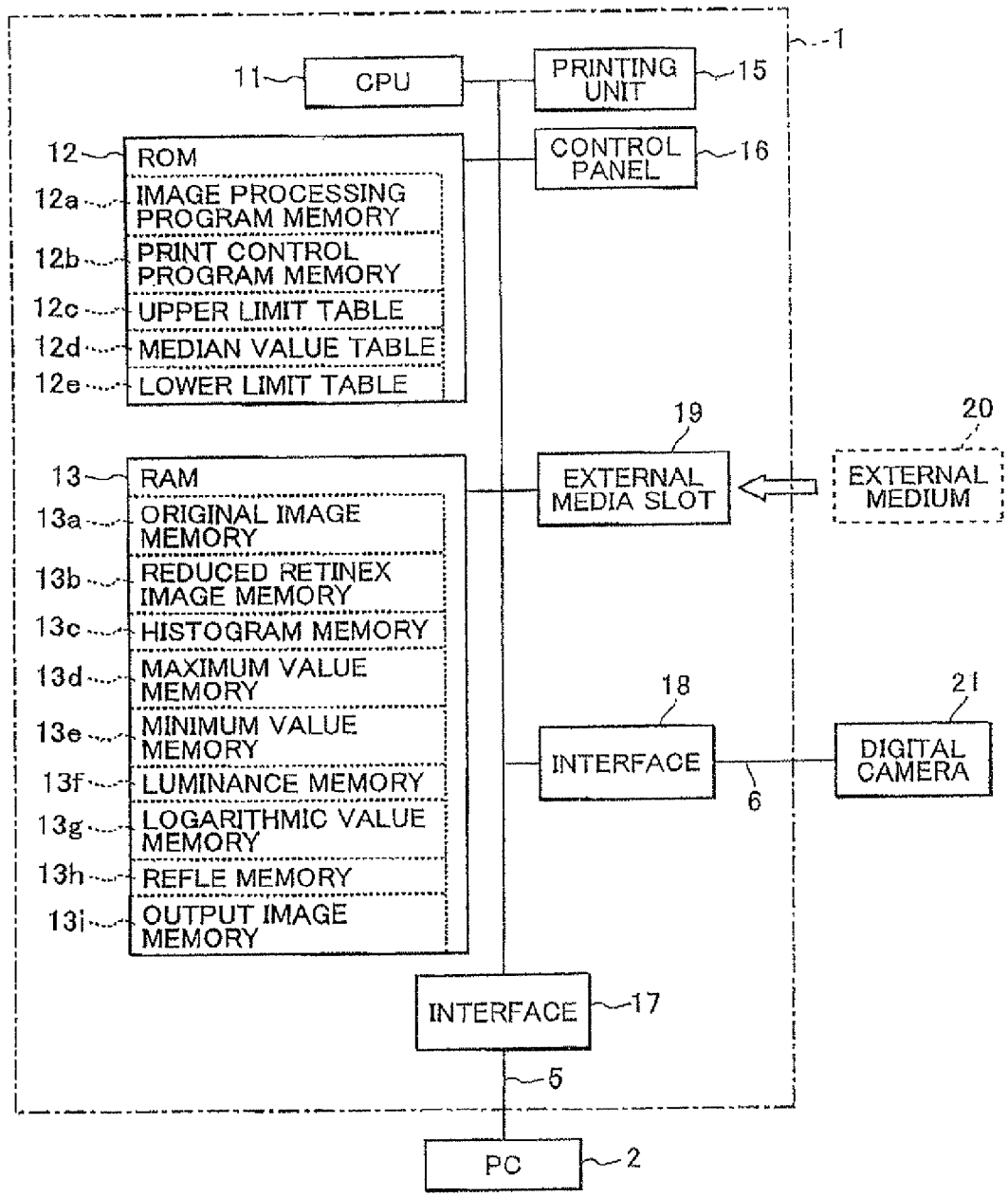
FIG. 2 is a block diagram showing the electrical structure of a printer provided with an image processing program according to an embodiment of the invention.

Therefore, the output value Out is the reflected light component. Since pixel values in the output image data must be values for forming colors, output values Out including a color component are found. As is clear from equation (4), the calculated output value Out is a value incorporating an illumination component for which lighting and contrast have been corrected through gamma correction. FIG. 2 shows an example of a relationship between the pixel values 0-255 for input image data and the output values Out obtained by performing the process according to equation (4).

An image processing device and a storage medium storing an image processing program according to an embodiment of the invention will be described with reference to FIGS. 2 through 7. FIG. 2 is a block diagram showing the electrical structure of a printer 1 having a function for performing an image process according to the embodiment. The printer 1 is connected to a personal computer (hereinafter referred to as a "PC") 2, a digital camera 21, and/or an external medium 20. An image processing program installed on the printer 1 executes a Retinex process and a histogram process on image data (image data for an original document or the like) inputted from the PC 2, digital camera 21, or external medium 20. The image processing program corrects low-quality regions of the image data, such as backlit image regions.

As shown in FIG. 2, the printer 1 includes a CPU 11, a ROM 12, a RAM 13, a printing unit 15, and a control panel 16. The printing unit 15 has a print head and the like for printing out image data on a printing medium, such as paper. The control panel 16 has a user operating unit configured of a ten-key pad and the like, for example, enabling the user to input values for the size of the outputted image and the like.

The printer 1 also includes an interface 17, an interface 18, and an external media slot 19. The interface 17 is provided for connecting the printer 1 to the PC 2 with a cable 5. The interface 18 is provided for connecting the printer 1 to the digital camera 21 with a cable 6. The external media slot 19 allows the user to detachably mount the external medium 20 in the printer 1, the external medium 20 being an SD card or a Memory Stick, for example. The interfaces 17 and 18 use the Universal Serial Bus (USB) communication method.

Accordingly, image data stored on the PC 2 can be inputted into the printer 1 via the cable 5 and the interface 17, while image data captured by the digital camera 21 can be inputted into the printer 1 via the cable 6 and the interface 18. Further, image data stored on the external medium 20 can be inputted into the printer 1 when the external medium 20 is mounted in the external media slot 19.

Figure 7:
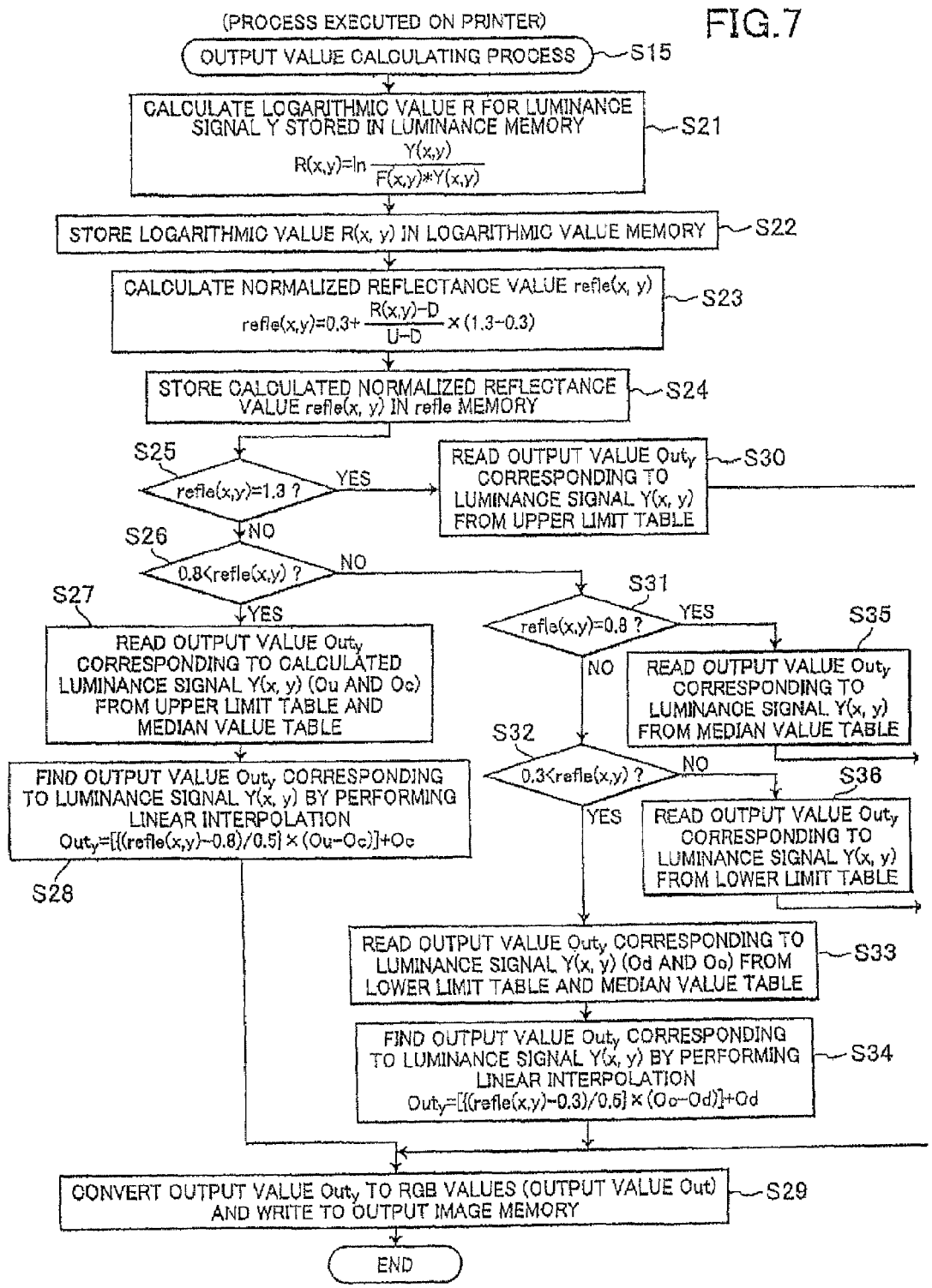
FIG. 7 is a flowchart illustrating steps in an output value calculating process executed during the correction process of FIG. 6.

The CPU 11 is an arithmetic processor that controls the overall operations of the printer 1. The ROM 12 stores various control programs executed by the CPU 11 and fixed values used when the CPU 11 executes programs. The ROM 12 includes an image processing program memory 12a, and a print control program memory 12b. The image processing program memory 12a stores the image processing program for performing such image processing as the Retinex process and the histogram process. The print control program memory 12b stores a print control program for executing a printing operation. The ROM 12 also includes an upper limit table 12c, a median value table 12d, a lower limit table 12e, and the like that are used for performing correction in the Retinex process. A program described in the flowcharts of FIGS. 6 and 7 is stored in the ROM 12 as part of the image-processing program 12a.

The upper limit table 12c, median value table 12d, and lower limit table 12e are employed to generate output values $Out_y$ that have been corrected according to the Retinex process. The tables store luminance signals Y in association with output values $Out_y$ as output for the luminance signals Y. In other words, the tables 12c-12e are for obtaining the output values $Out_y$ on which the Retinex process has been performed, based on the luminance signals Y of the original image. Provided with the tables 12c-12e, the printer 1 can generate output image data based on data in the tables to subject the original image data to the Retinex process without performing gamma correction calculation.

The original image data in this example is configured of raster data having pixel values (signal intensity values and RGB values) for each pixel forming the original image. In the embodiment, the original image data and output image data are configured of RGB values, each of which is a value in the range 0-255.

Specifically, the RGB values include components representing the three primary colors of light, i.e. an R value representing red, a G value representing green, and a B value representing blue. The combination of RGB values for each pixel of an input image indicates one color (hue, tone, etc.). The greater the RGB values, the higher the luminance (brightness).

Rather than performing the Retinex process directly on this original image data (RGB values), the printer 1 in the embodiment is configured to execute the Retinex process after converting RGB values in the original image data to luminance signals Y. Therefore, the tables 12c-12e store output values $Out_y$ found by correcting luminance signals Y according to the Retinex process in association with the luminance signals Y. Hence, the printer 1 can maintain the color balance of the original image in the processed output image better than when performing the Retinex process on each of the RGB values.

The luminance signals Y and chromatic signals Cb and Cr are calculated from the RGB values according to equation (5) below. However, since the RGB values fall within a predetermined range, the luminance signals Y also fall within a predetermined range, and specifically between 0 and 255.

$$\begin{pmatrix} Y \\ Cb \\ Cr \end{pmatrix} = \begin{pmatrix} 0.30 & 0.59 & 0.11 \\ -0.17 & -0.34 & 0.51 \\ 0.51 & -0.43 & -0.08 \end{pmatrix} \begin{pmatrix} R \\ G \\ B \end{pmatrix} \quad \text{Equation (5)}$$

Accordingly, the signal intensity I(x, y) for the original image in equation (4) is set to the luminance signal Y(x, y) in the embodiment, and the luminance signal Y is subjected to the Retinex process to produce the output value $Out_y$, as shown in equation (4').

$$Out_y(x, y) = \frac{Y(x, y)}{\left(\frac{Y(x, y)}{255 \times refle(x, y)}\right)^{(1-\frac{1}{\gamma})}} \quad \text{Equation (4')}$$

Since the gamma coefficient is an arbitrary constant, equation (4) or (4') for calculating the output value Out in the Retinex process has two variables (parameters), specifically the pixel value in the original image (the luminance signal Y) and the normalized reflectance value refle. Hence, by selecting the normalized reflectance value refle, it is possible to calculate each output value $Out_y$ corresponding to the luminance signal Y of each value 0-255 and to obtain table data (table values) to be stored in the tables 12c-12e.

Obviously, more accurate output values $Out_y$ (output values $Out_y$ approaching values obtained in the calculation of equation (4)) can be obtained when output values $Out_y$ corresponding to multiple normalized reflectance values refle are provided as table data. However, an increase in table data is not preferable because a larger capacity of memory would be required.

Therefore, the ROM 12 in the embodiment stores three tables 12c-12e corresponding to three predetermined normalized reflectance values refle in order to obtain suitable output values $Out_y$ with a smaller number of tables. Further, as will be described later with reference to FIG. 7, the image-processing program 12a is configured for generating output values $Out_y$ in combination with linear interpolation to extract output values $Out_y$ from the tables 12c-12e based on the normalized reflectance value refle. In this way, the printer 1 can produce accurate output values $Out_y$ while suppressing the amount of memory required for storing table data.

More specifically, the upper limit table 12c, median value table 12d, and lower limit table 12e are provided for predetermined reflectance values (normalized reflectance values refle). The upper limit table 12c is formed for a normalized reflectance value refle of 1.3, the median value table 12d for a normalized reflectance value refle of 0.8, and the lower limit table 12e for a normalized reflectance value refle of 0.3.

Figure 3:
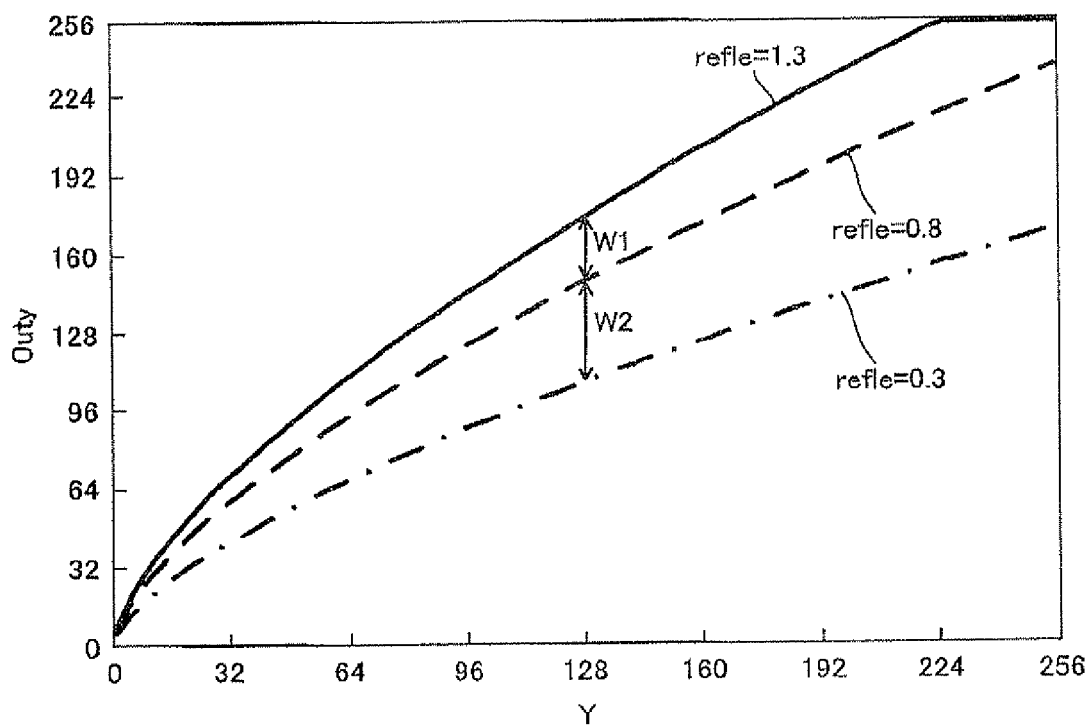
FIG. 3 is a graph illustrating the relationship between luminance signals and output values stored in each of an upper limit table, median value table, and lower limit table provided in the printer.

FIG. 3 is a graph showing the relationship between the luminance signals Y (first pixel values) and output values $Out_y$ (second pixel values) stored in the tables 12c-12e according to the embodiment, where the horizontal axis represents the luminance signals Y and the vertical axis the output values $Out_y$. The curves in the graph of FIG. 3 represent output values $Out_y$ obtained by processing luminance signals Y according to equation (4'), the curve depicted by a solid line indicating the case when the normalized reflectance value refle is 1.3, the curve depicted by a dashed line indicating the case when the normalized reflectance value refle is 0.8, and the curve depicted by a single-dot chain line indicating the case when the normalized reflectance value refle is 0.3. The values obtained by each of these curves are the output values $Out_y$ generated for each integral value of luminance signal Y from 0 to 255. The acquired output values $Out_y$ are stored in the corresponding tables 12c-12e in association with each luminance signal Y value from 0 to 255.

As shown in FIG. 3, despite varying the normalized reflectance values refle of 0.3, 0.8, and 1.3 at equal intervals of 0.5 each, the intervals between the three characteristic lines f1-f3 are not uniform. For example, when the value of the luminance signal Y is 128, a difference W1 between the output value $Out_y$ for the normalized reflectance value refle of 1.3 and the output value $Out_y$ for the normalized reflectance value refle of 0.8 is clearly smaller than a difference W2 between the output value $Out_y$ for the normalized reflectance value refle of 0.8 and the output value $Out_y$ for the normalized reflectance value refle of 0.3. In other words, the output values $Out_y$ change nonlinearly in response to changes in the normalized reflectance values refle. Hence, when performing linear interpolation to generate output values $Out_y$ with the three tables 12c-12e, bias in the output values $Out_y$ relative to changes in the normalized reflectance value refle can be reflected in the interpolation, thereby producing more exact output values $Out_y$ when using such table data.

Here, the way of configuring the data content in tables stored in the printer 1, i.e., the way to design normalized reflectance values refle used to form the table data is an important factor for producing accurate output values $Out_y$ with a small number of tables.

Next, a detailed description will be given of the normalized reflectance values refle used to form the tables 12c-12e stored in the printer 1, while referring to FIGS. 4A, 4B, and 5.

Figure 4A:
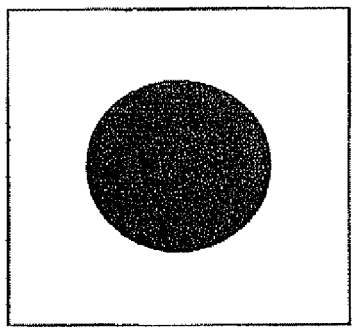
FIG. 4A is an explanatory diagram showing an image taken under backlit conditions.
Figure 4B:
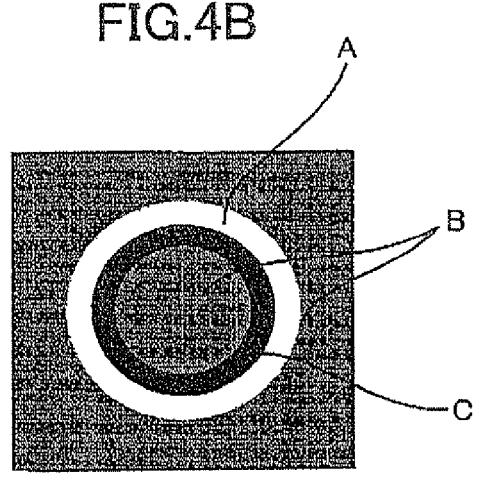
FIG. 4B is an explanatory diagram showing an image formed by converting each pixel value in the image of FIG. 4A to reflectance values (logarithmic values)

FIGS. 4A and 4B illustrate the relationship between the logarithmic value R found from the original image data and the original image. FIG. 4A shows an original image conceptually depicting a backlit image. The original image is rectangular in shape and has a circular backlit region in the center thereof. FIG. 4B shows an image formed by converting each pixel value in the original image to a reflectance (logarithmic value R). Here, the logarithmic value R is a value indicating the difference between the value of a target pixel and the average luminance of its peripheral pixels, i.e., a value representing the difference in brightness between the target pixel and its peripheral pixels. In the converted image, a region A depicted in white denotes a region in which the logarithmic value R is positive; a region C depicted in black denotes a region in which the logarithmic value R is negative; and a region B depicted in gray denotes a region in which the logarithmic value R is 0.

A positive value of the logarithmic value R indicates that the target pixel is brighter than its peripheral pixels and, conversely, a negative value of the logarithmic value R indicates that the target pixel is darker than its peripheral pixels. When the logarithmic value R is 0, the target pixel has the same brightness as its peripheral pixels.

In most cases, the brightness is uniform in each region of the original image. Most of the backlit region is uniformly dark, while regions other than the backlit region are uniformly bright. As shown in the converted image, only a few pixels belonging to specific areas of the image, such as near the outline of the object or near the border between the backlit region and the non-backlit region are brighter or darker than their peripheral pixels.

FIG. 5 shows a histogram of logarithmic values R for a common image. The histogram in FIG. 5 shows the results of tabulating logarithmic values R for all pixels in the original image, where the horizontal axis represents the logarithmic value R and the vertical axis represents the number of pixels. A median value M, given the value 0, is set at the peak of the logarithmic values R in the histogram so that the logarithmic values R are distributed fairly symmetrically on both sides of the median value M. Further, the logarithmic values R are concentrated near the median value M (that is, where the logarithmic value R=0), indicating that target pixels and their peripheral pixels have substantially the same brightness in most regions of the original image. A mode value of logarithmic values R is also zero. In other words, the histogram indicates that the majority of logarithmic values R for pixels in the original image are 0 (near 0).

Note that a logarithmic value R is obtained by subtracting the logarithm of a peripheral average luminance from the logarithm of a pixel value (luminance signal) of a subject pixel.

The printer 1 is configured to generate output values $Out_y$ using table data corresponding to the case when the logarithmic value R is 0 (the median value table 12d) since the logarithmic value R for most pixels is 0 or near 0. Hence, by using output values $Out_y$ calculated when the logarithmic value R is 0 as the table data, it is possible to improve the accuracy of generating output values $Out_y$ using table data. In fact, the results of calculations performed using the logarithmic value R=0 for the reflected light component in equation (4') are infinitely large. Therefore, a normalized reflectance value refle found by normalizing the calculated logarithmic value R is used.

When normalizing the logarithmic value R, it is necessary to define a clipped range for normalization (normalizing range). In the embodiment, an upper limit U of the logarithmic values R is set to the upper point of a range greater than the median value M and including 45% of the pixels; a lower limit D of logarithmic values R is set to the lower point of a range smaller than the median value M including 45% of the pixels; and the clipped range is set to the range between the lower limit D and the upper limit U. Next, the logarithmic values R in the clipped range are normalized to a predetermined range between a lower limit d and an upper limit u. Normalization is performed by setting the lower limit d to a logarithmic value R less than or equal to the lower limit D and the upper limit u to a logarithmic value R greater than or equal to the upper limit U, and by converting the logarithmic values R in the clipped range between the lower limit D and the upper limit U to values in the range from the lower limit d to the upper limit u with a linear or nonlinear function. The output values $Out_y$ stored in the tables 12c-12e are calculated using the normalized reflectance value refle found through this normalization. While this clipped range contains 45% of the pixels both above and below the median value M, the number of pixels above and below the median value M is not limited to 45% and may be greater than or less than this percentage.

When designing the tables 12c-12e used in the embodiment, the logarithmic values R are normalized to satisfy the following three conditions. The first condition is that the normalized reflectance values refle obtained through normalization must not include the valve 0 to avoid cases in which the output value $Out_y$ cannot be calculated, as described above.

The second condition is that the upper limit u of normalized reflectance values refle must be greater than or equal to 1 because pixel values for the output image cannot be outputted as values greater than or equal to the maximum value (255) when the normalized reflectance value refle is less than 1. For example, if a pixel value of 255 were inputted for the original image, the pixel value corresponding to the output image would be less than 255, shrinking the dynamic range. Hence, the second condition in the embodiment is that the upper limit u of normalized reflectance values refle be set to a value greater than or equal to 1 in order that the maximum pixel value generated for the output image can be greater than or equal to 255. While output values greater than 255 may be generated when the normalized reflectance value refle is a value greater than 1, the output values are processed so that generated pixel values greater than 255 are converged to 255.

The third condition is that the normalized reflectance values refle should have a width of 1. When the normalized reflectance values refle have a width of 1, it is possible to set the dynamic range of the output image substantially the same as the dynamic range of the original image. Since the pixel values of the original image fall within the range from 0 to 255, pixel values for the output image within the same range of 0-255 can be obtained in the embodiment by setting the width of the normalized reflectance values refle to 1, preventing an overall change in color tone in the output image compared with the input image.

Accordingly, the logarithmic values R are normalized to values within a range from the lower limit d, which is a value greater than 0, and the upper limit u found by adding 1 to the lower limit d. In the embodiment, the lower limit d in equation (3) is set to 0.3 and the upper limit u to 1.3 so that the logarithmic values R are normalized to values within 0.3-1.3. In other words, the normalized reflectance value refle of each pixel in the original image is set to a value between 0.3 and 1.3. When the logarithmic values R are normalized to the range 0.3-1.3, the normalized reflectance value refle for a logarithmic value R of 0 is 0.8. Hence, the target pixel has a positive logarithmic value R when the normalized reflectance value refle exceeds 0.8, indicating that the target pixel is brighter than its peripheral pixels, and has a negative logarithmic value R when the normalized reflectance value refle is less than 0.8, indicating that the target pixel is darker than its peripheral pixels.

In the embodiment, the upper limit table 12c, median value table 12d, and lower limit table 12e have been formed for cases in which the normalized reflectance value refle is 1.3, 0.8, and 0.3, respectively. Specifically, the upper limit table 12c is formed using the upper limit of the normalized reflectance value refle (when logarithmic value R is positive), the lower limit table 12e is formed using the lower limit of the normalized reflectance value refle (when logarithmic value R is negative), and the median value table 12d is formed using the normalized reflectance value refle when the logarithmic value R=0, as described above.

The printer 1 also normalizes logarithmic values R calculated from the inputted original image to values within the range 0.3-1.3. Hence, in the printer 1, the normalized reflectance values refle of logarithmic values R calculated from the inputted original image and the normalized reflectance values refle used to form the tables 12c-12e have the same range and can therefore be matched. Accordingly, precise output values $Out_y$ can be generated using the three tables 12c-12e.

In addition, by providing the upper limit table 12c and lower limit table 12e, the printer 1 can derive output values $Out_y$ corresponding to all normalized reflectance values refle calculated from an original image inputted into the printer 1 by performing interpolation using table data stored in the tables 12c-12e.

While the normalized reflectance values refle are set to values within the range 0.3-1.3 in the embodiment, the invention is not limited to this range of normalized reflectance values refle. For example, the range of normalized reflectance values refle may be set to 0.1-1.1 or 0.4-1.4 for the same clipped range. Further, the width of normalized reflectance values refle need not be strictly 1, but may be set to a smaller range than 1, such as 0.9, or a larger range than 1, such as 1.5.

Referring to FIG. 2 again, the RAM 13 is a rewritable random access memory that includes a work area for storing a set of registers required when the CPU 11 executes the control programs, and a temporary area for temporarily storing data during such processes. The RAM 13 includes an original image memory 13a for storing original image data; a reduced Retinex image memory 13b for storing reflectance values (logarithmic values Rs) found by reducing the original image and performing the Retinex process on the reduced image; a histogram memory 13c for storing a histogram of the logarithmic values Rs (frequency distribution); a maximum value memory 13d for storing the maximum reflectance value in the reduced image (logarithmic value Rs); a minimum value memory 13e for storing the minimum reflectance value in the reduced image (logarithmic value Rs); a luminance memory 13f for storing luminance signals Y generated from RGB values for the original image; a logarithmic value memory 13g for storing reflectance values (reflected light component and logarithmic value R) for the original image; a refle memory 13h for storing normalized reflectance values refle; and an output image memory 13i for storing output image data corrected through the Retinex process. Here, "s" is a suffix added to indicate the reduced image and is not added for the original image.

The original image data memory 13a stores image data inputted from the PC 2, digital camera 21, and external medium 20 via the interface 17, interface 18, and external media slot 19, respectively. When new image data is inputted into the printer 1, original image data stored in the original image memory 13a is overwritten with the newly inputted image data.

The reflectance memory 13b is a memory area used in the Retinex process for storing logarithmic values Rs(x, y) obtained from luminance values of the original image after the original image is compressed (reduced).

The original image is compressed according to a method well known in the art, such as the nearest neighbor method for sampling a value of a pixel nearest a position of the original image corresponding to a pixel of the reduced image and for using the sampled pixel value, or the bi-cubic method or average pixel method for performing interpolation using pixels surrounding a position in the original image corresponding to a pixel of the reduced image. The nearest neighbor method is used when processing speed is given priority over image quality, and the bi-cubic method or average pixel method is used when giving priority to image quality over processing speed.

The printer 1 reduces the original image according to one of the above methods, calculates the logarithmic value Rs for each pixel in the reduced image using equation (2) described above, and stores the logarithmic value Rs for each pixel in the reduced Retinex image memory 13b in association with its coordinates (x, y). When executing a new correction process, values already stored in the reduced Retinex image memory 13b are updated with the new values. The logarithmic value Rs is calculated by using a luminance signal Ys(x, y) for the signal intensity I(x, y) of the original image in equation (2).

The histogram memory 13c stores results of tabulating the number of pixels having the same reflectance level for the reflectance values (logarithmic values Rs) stored in the reduced Retinex image memory 13b. The histogram memory 13c is provided with a memory area corresponding to each reflectance level. Hence, the histogram memory 13c functions to form a histogram of logarithmic values Rs.

The CPU 11 sets the number of memory areas in the histogram memory 13c and the level of the logarithmic value Rs managed in each area when a new original image is inputted into the printer 1. Specifically, after the logarithmic value Rs is found for all pixels constituting the reduced image, the CPU 11 determines a range for producing a histogram based on maximum and minimum values of logarithmic values Rs and selects a range of levels to be tabulated (managed levels), thereby setting the number of areas in the histogram memory 13c and the level for each area.

After determining to which level a logarithmic value Rs stored in the reduced Retinex image memory 13b belongs, the CPU 11 increments the value stored in the memory corresponding to the determined level of the logarithmic value Rs. In this way, the CPU 11 tabulates the number of pixels for each level.

After determining the levels for all logarithmic values Rs stored in the reduced Retinex image memory 13b, the CPU 11 can determine a median value M from the tabulation results stored in the histogram memory 13c and set an upper limit U and a lower limit D. The printer 1 uses the range from the lower limit D to the upper limit U determined from the tabulation results as the clipped range for the original image data stored in the original image memory 13a.

In this way, the printer 1 can set a clipped range for the original image using a histogram formed from the reduced image. This method eliminates the need to generate a histogram for all pixels in the original image, thereby reducing the processing time for setting the clipped range.

The maximum value memory 13d and minimum value memory 13e store a maximum value and minimum value, respectively, of the logarithmic values Rs stored in the reduced Retinex image memory 13b, which values are used for generating the histogram. A value of 0 is written to the maximum value memory 13d and minimum value memory 13e at the beginning of the correction process in which the Retinex process is performed on the original image. After each logarithmic value Rs is calculated and stored in the reduced Retinex image memory 13b, the calculated logarithmic value Rs is compared with the value stored in the maximum value memory 13*d*. If the new logarithmic value Rs is larger than the value stored in the maximum value memory 13*d*, then the maximum value memory 13*d* is updated to reflect the new value.

Further, when the newly calculated logarithmic value Rs is smaller than the value stored in the maximum value memory 13*d*, this logarithmic value Rs is compared with the value stored in the minimum value memory 13*e*. If the newly calculated logarithmic value Rs is smaller than the value stored in the minimum value memory 13*e*, then the minimum value memory 13*e* is updated to reflect the new value.

As a result of this process, the maximum value memory 13*d* saves the maximum value of logarithmic values Rs stored in the reduced Retinex image memory 13*b*, and the minimum value memory 13*e* stores the minimum value of logarithmic values Rs stored in the reduced Retinex image memory 13*b*.

The CPU 11 references the maximum and minimum values stored in the maximum value memory 13*d* and minimum value memory 13*e* when generating the histogram and determines the range for generating the histogram based on these maximum and minimum values.

The luminance memory 13*f* stores a luminance signal Y (luminance signal Ys) and the chromatic signals Cb and Cr calculated from RGB values using equation (5). As described above, the printer 1 does not perform the Retinex process directly on original image data (RGB values) for the inputted original image, but performs the Retinex process after converting the RGB values to luminance signals Y. The luminance signals Y and the like converted from RGB values are stored in the luminance memory 13*f* in association with the coordinates (x, y) for the source RGB values. The printer 1 generates reflectance values and output values $Out_y$ based on the luminance signals Y or Ys stored in the luminance memory 13*f*.

In order to generate the output values $Out_y$ of the output image, the printer 1 calculates reflectance values (logarithmic values Rs and R) twice from both the reduced image and the original image. When calculating reflectance values, the printer 1 generates the luminance signals Ys or Y from RGB values for the source image data (reduced image data or original image data) and writes these values to the luminance memory 13*f*. The printer 1 first generates the luminance signals Ys for the reduced image and stores these luminance signals Ys in the luminance memory 13*f*. When the printer 1 subsequently generates the luminance signals Y for the original image, the printer 1 resets the luminance signals Ys stored in the luminance memory 13*f* to 0 and stores the luminance signals Y and the like newly generated from the RGB values of the original image data in the luminance memory 13*f*.

The logarithmic value memory 13*g* functions to store logarithmic values R, which are reflectance values calculated from the original image data. More specifically, the CPU 11 uses the luminance signals Y for the original image data stored in the luminance memory 13*f* to calculate the logarithmic value R(x, y) corresponding to each pixel according to equation (2') shown below and stores the calculated logarithmic value R(x, y) in the logarithmic value memory 13*g* in association with its coordinates. Values in the logarithmic value memory 13*g* are updated each time a new correction process is executed.

$$R(x, y) \cong \ln \frac{Y(x, y)}{F(x, y) * Y(x, y)} \qquad \text{Equation (2')}$$

The refle memory 13*h* functions to store the normalized reflectance values refle obtained by normalizing the logarithmic values R stored in the logarithmic value memory 13*g*. The normalized reflectance values refle stored in the refle memory 13*h* are produced by normalizing each logarithmic value R(x, y) stored in the logarithmic value memory 13*g* to a value within a range from a lower limit 0.3 to an upper limit 1.3 according to equation (3). A normalized reflectance value refle(x, y) is generated for each logarithmic value R(x, y) and written to the refle memory 13*h* in association with the coordinates. The printer 1 reads the normalized reflectance values refle from the refle memory 13*h* when generating the output values $Out_y$ and selects at least one of the tables 12*c*-12*e* corresponding to the normalized reflectance value refle read from the refle memory 13*h* for obtaining the output value $Out_y$.

The output image memory 13*i* functions to store output image data to be outputted to the printing unit 15. The output image data stored in the output image memory 13*i* is output values Out generated from the original image according to the correction process and is configured of RGB values for each pixel forming the output image. As described above, the output value $Out_y$ corresponding to the luminance signal Y(x, y) of the original image is obtained from at least one of the tables 12*c*-12*e* in the embodiment. Since the output value $Out_y$ obtained from the tables 12*c*-12*e* is a luminance signal Y, the output value $Out_y$ is converted to RGB values according to equation (6) shown below after performing any necessary linear interpolation and the like, to obtain an output value Out.

$$\begin{pmatrix} R \\ G \\ B \end{pmatrix} = \begin{pmatrix} 1.0 & 0 & 1.37 \\ 1.0 & -0.34 & -0.70 \\ 1.0 & 1.73 & 0 \end{pmatrix} \begin{pmatrix} Y \\ Cb \\ Cr \end{pmatrix} \qquad \text{Equation (6)}$$

The printer 1 calculates one output value $Out_y(x, y)$ for each luminance signal Y(x, y) of the original image and generates an output value Out (x, y) corresponding to each output value $Out_y(x, y)$. The printer 1 writes the output value Out(x, y) generated above in the output image memory 13*i* in association with the coordinates. When executing a printing operation, the printer 1 reads the output value Out (output image data) from the output image memory 13*i* and outputs this data to the printing unit 15. After outputting the output values Out to the printing unit 15, the values are deleted from the output image memory 13*i*.

Next, the correction process executed on the printer 1 having the above construction will be described with reference to the flowcharts in FIGS. 6 and 7. The correction process is implemented based on the image-processing program 12*a* described above and produces output image data by performing the Retinex process on inputted image data (original image data).

In S1 of the correction process, the CPU 11 reads the original image data from the original image memory 13*a*. In S2 the CPU 11 forms a reduced image, converts the RGB values in the reduced image to luminance signals Ys and chromatic signals Cb and Cr, and writes these values to the luminance memory 13*f* in correspondence with the coordinates (x, y) of the respective RGB values. In this way, luminance signals Ys corresponding to all pixels in the reduced image are stored in the luminance memory 13*f*.

In S3 the CPU 11 calculates a reflectance value (logarithmic values Rs) for a luminance signal Ys of the reduced image stored in the luminance memory 13*f*. Specifically, the CPU 11 calculates the logarithmic value Rs(x, y) for a pixel using the luminance signal Ys(x, y) as the signal intensity I(x, y) in equation (2) (that is, substituting R(x, y) with Rs(x, y) and substituting Y(x, y) with Ys (x, y) in equation (2')). More specifically, the CPU 11 performs convolution with a Gaussian filter F(x, y) on an m×n region including a target pixel at coordinates (x, y), finds an average luminance value of peripheral pixels, averaged while adding weight to the peripheral pixels based on their distance from the target pixel, and calculates the logarithmic value Rs(x, y), which is the reflectance value of the target pixel, finding a natural logarithm by dividing the luminance signal Ys (x, y) of the target pixel with the average luminance value.

In S4 the CPU 11 stores the logarithmic value R(x, y) calculated in S3 in the reduced Retinex image memory 13b and in S5 determines whether the logarithmic value Rs(x, y) is greater than the value stored in the maximum value memory 13d. If the logarithmic value Rs(x, y) is greater than the value stored in the maximum value memory 13d (S5: YES), then in S6 the CPU 11 overwrites the values stored in the maximum value memory 13d with the new logarithmic value Rs (x, y). However, if the logarithmic value Rs (x, y) is smaller than the value stored in the maximum value memory 13d (S5: NO), then in S7 the CPU 11 determines whether the logarithmic value Rs is smaller than the values stored in the minimum value memory 13e. If the logarithmic value Rs is smaller than the value stored in the minimum value memory 13e (S7: YES), then in S8 the CPU 11 overwrites the value stored in the minimum value memory 13e with the new logarithmic value Rs.

After completing the process in S6 or S8, the CPU 11 determines in S9 whether the process has been completed for all pixels in the reduced image. In this way, the CPU 11 repeats the process in S3-S8 for each target pixel (each luminance signal Ys) until the process has been completed for all luminance signals Ys in order to generate the logarithmic values Rs for each pixel in the reduced image and to determine maximum and minimum values of the logarithmic values Rs. Hence, a luminance signal Ys is read from the luminance memory 13f each time the process in S3-S8 is executed in an order conforming to the coordinates (the order of a raster scan from the first coordinates to the last coordinates). When the CPU 11 determines in S9 that the process has been completed for all pixels (S9: YES), in S10 the CPU 11 forms a histogram for the logarithmic values Rs stored in the reduced Retinex image memory 13b within a range from the maximum value stored in the maximum value memory 13d to the minimum value stored in the minimum value memory 13e.

In S11 the CPU 11 finds the median value M from the histogram formed in S10 and in S12 sets a clipped range of logarithmic values Rs (upper limit U and lower limit D) from the median value M and the histogram. Specifically, the CPU 11 sets the upper limit U to the logarithmic value Rs at an upper point of a range greater than the median value M that includes 45% of the pixels, sets the lower limit D to the logarithmic value Rs at a lower point of a range less than the median value M that includes 45% of the pixels, and sets the clipped range to the range between the lower limit D and the upper limit U including 45% of the pixels both greater than and less than the median value M.

In S13 the CPU 11 resets the luminance memory 13f to 0. In S14 the CPU 11 converts RGB values in the original image data stored in the original image memory 13a to luminance signals Y and chromatic signals Cb and Cr and writes these values to the luminance memory 13f in correspondence with the coordinates (x, y) of the corresponding RGB values. In S15 the CPU 11 executes an output value calculating process for generating output image data. In S16 the CPU 11 determines whether the output value calculating process of S15 has been performed for all pixels in the original image. While there remain pixels in the original image that have not been converted to output values Out (S16: NO), the CPU 11 returns to S15 and repeats the process in S15 until output values Out have been generated for all pixels in the original image. Once all pixels of the original image have been converted to output values Out (S16: YES), the CPU 11 ends the correction process.

However, if the CPU 11 determines in S7 that the logarithmic value Rs is greater than or equal to the value stored in the minimum value memory 13e (S7: NO), then the CPU 11 skips to the process of S9, since there is no need to update the value in the minimum value memory 13e. Further, if the CPU 11 determines in S9 that the process for generating logarithmic values Rs and determining the maximum and minimum values of the logarithmic values Rs has not been completed for all pixels in the reduced image (S9: NO), then the CPU 11 returns to S3 and repeats the process in S3-S9 until the process has been completed for all luminance signals Y.

FIG. 7 is a flowchart illustrating steps in the output value calculating process of S15 executed during the correction process of FIG. 6. The CPU 11 executes the output value calculating process for each target pixel (each luminance signal Y). The CPU 11 reads a luminance signal Y from the luminance memory 13f each time the output value calculating process is executed in an order conforming to the coordinates (in the raster scanning order from the initial coordinates to the final coordinates) and repeats the process until the luminance signal Y for the last pixel has been processed.

Through the output value calculating process of S15 the CPU 11 calculates reflectance values (logarithmic values R) for the luminance signals Y stored in the luminance memory 13f. As described above, the CPU 11 finds the luminance signal Y for each pixel in the original image and stores this luminance signal Y in the luminance memory 13f in association with its coordinates (x, y). In S21 of FIG. 7 the CPU 11 calculates the logarithmic value R(x, y) for each pixel using the luminance signal Y(x, y) based on equation (2').

In S22 the CPU 11 stores the logarithmic value R calculated above in the logarithmic value memory 13g. In S23 the CPU 11 calculates the normalized reflectance value refle(x, y) by normalizing the logarithmic value R stored in the logarithmic value memory 13g to a value within the range 0.3-1.3 set as the range between the lower limit D and upper limit U in S12.

In the normalization process, the CPU 11 sets the logarithmic value R to 0.3 when the logarithmic value R(x, y)≦D, sets the logarithmic value R to 1.3 when the logarithmic value R(x, y)≧U, and normalizes the logarithmic value R according to equation (3) when D<logarithmic value R(x, y)<U. In the embodiment, d and u in equation (3) are set to 0.3 and 1.3, respectively.

In S24 the CPU 11 stores the normalized reflectance value refle(x, y) calculated above in the refle memory 13h in association with its coordinates. In S25 the CPU 11 determines whether the normalized reflectance value refle(x, y) is 1.3. If the normalized reflectance value refle(x, y) is not 1.3 (S25: NO), indicating that the normalized reflectance value refle(x, y) is less than 1.3, then in S26 the CPU 11 determines whether the normalized reflectance value refle(x, y) is greater than 0.8. Hence, through the process of S26 the CPU 11 determines whether the normalized reflectance value refle is within the range greater than 0.8 and less than 1.3. If the normalized reflectance value refle(x, y) is greater than 0.8 (S26: YES), then in S27 the CPU 11 reads the output value $Out_y$ corresponding to the luminance signal Y(x, y) read from the luminance memory 13f from both the upper limit table 12c and median value table 12d, setting Ou to the output value $Out_y$ read from the upper limit table 12c and Oc to the output value $Out_y$ read from the median value table 12d.

In S28 the CPU 11 performs linear interpolation on the output values Ou and Oc based on the normalized reflectance value refle(x, y) according to equation (7) below to find the output value $Out_y$ corresponding to the luminance signal Y(x, y).

$$Out y=[\{(refle(x,y)-0.8)/0.5\} \times (Ou-Oc)]+Oc \quad \text{Equation (7)}$$

In S29 the CPU 11 converts the output value $Out_y$ found in S28 back to RGB values according to equation (6) to generate an output value Out and writes the output value Out to the output image memory 13i in association with the coordinates (x, y) of the source luminance signal Y. Subsequently, the CPU 11 ends the output value calculating process.

However, if the CPU 11 determines in S25 that the normalized reflectance value refle(x, y) is 1.3 (S25: YES), then in S30 the CPU 11 reads the output value $Out_y$ corresponding to the luminance signal Y(x, y) from the upper limit table 12c and subsequently advances to S29.

Further, if the CPU 11 determines in S26 that the normalized reflectance value refle(x, y) does not exceed 0.8 (S26: NO), then in S31 the CPU 11 determines whether the normalized reflectance value refle(x, y) is 0.8. If the normalized reflectance value refle is not 0.8 (S31: NO), indicating that the normalized reflectance value refle is less than 0.8, then in S32 the CPU 11 determines whether the normalized reflectance value refle(x, y) exceeds 0.3. In other words, through S32 the CPU 11 determines whether the normalized reflectance value refle is within the range greater than 0.3 and less than 0.8. If the normalized reflectance value refle(x, y) exceeds 0.3 (S32: YES), then in S33 the CPU 11 reads the output value $Out_y$ corresponding to the luminance signal Y(x, y) read from the luminance memory 13f from both the lower limit table 12e and the median value table 12d, setting Oc to the output value $Out_y$ read from the median value table 12d and Od to the output value $Out_y$ read from the lower limit table 12e. In S34 the CPU 11 performs linear interpolation on the output values Oc and Od read above based on the normalized reflectance value refle(x, y) using equation (8) below to find the output value $Out_y$ corresponding to the luminance signal Y(x, y). Subsequently, the CPU 11 advances to S29.

$$Out y=[\{(refle(x,y)-0.3)/0.5\} \times (Oc-Od)]+Od \quad \text{Equation (8)}$$

Further, if the CPU 11 determines in S31 that the normalized reflectance value refle is 0.8 (S31: YES), then in S35 the CPU 11 reads the output value $Out_y$ corresponding to the luminance signal Y from the median value table 12d and advances to S29.

Further, if the CPU 11 determines in S32 that the normalized reflectance value refle(x, y) does not exceed 0.3 (S32: NO), indicating that the normalized reflectance value refle is 0.3, then in S36 the CPU 11 reads the output value $Out_y$ corresponding to the luminance signal Y from the lower limit table 12e and advances to S29.

Since the normalized reflectance values refle used for generating the output values $Out_y$ stored in the tables 12c-12e are 1.3, 0.8, and 0.3, respectively, linear interpolation need not be performed when the normalized reflectance value refle is 1.3, 0.8, or 0.3. The processes of S30, S35, and S36 are performed when the normalized reflectance value refle calculated for a pixel is 1.3, 0.8, and 0.3, respectively. After these steps, the CPU 11 advances directly to S29, skipping the linear interpolation operation performed in S28 and S34. Hence, when advancing directly to S29 from S30, S35, or S36, the CPU 11 converts the output value $Out_y$ read from the tables 12c-12e directly to the output value Out.

As described above, by referencing table data when performing the Retinex process on an inputted original image, the printer 1 can generate the output image without performing gamma correction, thereby achieving high-speed image processing. Since the printer 1 is also provided with table data formed with the normalized reflectance value refle most often found in an original image (the median value table 12d), the printer 1 can create accurate output values Out by referencing the table data and can maintain image quality despite generating the output image without performing gamma correction calculation.

While the invention has been described in detail with reference to the above aspects thereof, it would be apparent to those skilled in the art that various changes and modifications may be made therein without departing from the scope of the claims.

In the above-described embodiment, the RGB color system is used, but a color system other than the RGB color system may be used. For example, the invention may be applied to the CMY color model or the like.

According to the image-processing program 12a of the embodiments described above, the printer 1 calculates the normalized reflectance value refle and selects a table to be referenced based on the normalized reflectance value refle. The tables 12c-12e are formed using the normalized reflectance value refle as a parameter. However, the tables 12c-12e may also be formed using the logarithmic value R (other than 0) as a parameter, and the printer 1 may select a table based on the logarithmic value R.

In the above-described embodiment, the CPU 11 provided in the printer 1 executes the image processing program. However, this program may be provided to a personal computer as an application program that is executed by a CPU or the like provided in the personal computer. Further, the program may be executed by a multifunction peripheral having a plurality of functions including printer, scanner, copier, facsimile, and the like.

Either the single-scale Retinex (SSR) or multi-scale Retinex (MSR) method may be used in the Retinex process.

In the above-described embodiment, the CPU 11 in the printer 1 performs the Retinex process and the like. However, these processes may be performed with a digital signal processor (DSP). The DSP can be used to execute product-sum operations and other operations more quickly.

In the embodiment described above, the printer 1 is configured to temporarily store the calculated luminance signal and chromatic signals in the luminance memory 13f of the RAM 13. However, if it is desirable to reduce the quantity of data being stored, the printer 1 may read the pixel values (RGB values) from the original image memory as needed and calculate the luminance signal each time without storing the same.

Further, while the printer 1 finds a normalization range (clipped range) for normalizing the logarithmic values R (reflectance values) based on a median value in the histogram in the embodiments described above, the printer 1 may find this clipped range using a mode value or average value instead. Further, the concept of a target pixel having substantially the same brightness as its peripheral pixels includes the case in which the target pixel has exactly the same signal value as the average luminance value of its peripheral pixels, as well as the cases in which the logarithmic value R is 0 after truncating, rounding up, or rounding up or down to the nearest. Further, while the logarithmic value R is 0 when the signal value of the target pixel is the same as the average luminance value of its peripheral pixels, the median value, mode value, or average value of the logarithmic value R in a generated histogram is not always 0 and be deviate therefrom. Hence, a range covering this deviation may be set as the region in which the signal value of the target pixel is considered to be substantially the same as the average luminance value of its peripheral pixels.

In the embodiment described above, the printer 1 is provided with three tables capable of covering the entire range of normalized reflectance values refle. However, it is not necessary to provide the printer 1 with tables covering the entire range of normalized reflectance values refle. If the printer 1 is provided with at least the median value table 12d, the printer 1 can generate output values Out by both referencing the table and performing gamma correction calculation. In this case, the printer 1 executing the image-processing program 12a may be configured to truncate, round up, or round up or down to the nearest the normalized reflectance value refle and to generate output values Out using the median value table 12d for the range of normalized reflectance values refle producing a value of 0.8, while generating output values Out through gamma correction calculation for all other normalized reflectance values refle. Since the logarithmic value R for most pixels is 0 (concentrated near 0), the printer 1 can generate output values Out for most pixels by referencing a table corresponding to a logarithmic value R of 0 (the median value table 12d). In this way, the printer 1 can sufficiently increase processing speed by generating output values out while referencing the median value table 12d.

Further, the number of tables referenced according to the image-processing program 12a is not limited to three, but may be the single median value table 12d, as described above, or four or more tables.

While the printer 1 is configured to perform the Retinex process on the luminance signals Y in the embodiments described above, the printer 1 may instead be configured to perform the Retinex process using the RGB values themselves.

In the above-described embodiment, the tables 12c-12e store output values $Out_y$ (second pixel values) in association with the luminance signals Y (first pixel values). Instead, the tables may store the value $[Y(x,y)/(255 \times refle(x,y))]$ to the power of $(1-1/\gamma)$ in equation (4) or (4') (gamma-corrected values obtained by performing gamma correction on the first pixel values using a predetermined reflectance component) in association with the luminance signals Y (first pixel values).

What is claimed is:

1. An image processing device comprising:
a reflectance-component calculating portion that calculates a reflectance component based both on a pixel value of a subject pixel in an original image and on an average luminance of peripheral pixels around the subject pixel, the reflectance component being indicative of brightness of the subject pixel relative to the peripheral pixels;
a pixel-value generating portion that generates a pixel value of an output image based both on the pixel value of the subject pixel and on a corrected value obtained by performing gamma correction on the pixel value of the subject pixel using the reflectance component; and
a storage portion that stores, in association with first pixel values, table values including either gamma-corrected values obtained by performing gamma correction on the first pixel values using each of a plurality of predetermined reflectance component or second pixel values calculated based both on the gamma-corrected values and on the first pixel values, wherein the pixel-value generating portion comprising:
an extracting portion that extracts at least one of the table values corresponding to the pixel value of the subject pixel; and
a determining portion that determines the pixel value of the output image based on the at least one of the table values extracted by the extracting portion;
wherein one of the plurality of the predetermined reflectance component is the reflectance component calculated by the reflectance-component calculating portion when the pixel value of the subject pixel is substantially identical with the average luminance of the peripheral pixels;
wherein, when the reflectance component calculated by the reflectance-component calculating portion equals to one of the plurality of predetermined reflectance components, the extracting portion extracts one of the table values corresponding to the one of the plurality of predetermined reflectance components;
wherein, when the reflectance component calculated by the reflectance-component calculating portion is different from any one of the plurality of predetermined reflectance components, the extracting portion extracts two of the table values corresponding to the respective ones of the plurality of predetermined reflectance components that surrounds the reflectance component calculated by the reflectance-component calculating portion; and
wherein the determining portion performs interpolation based both on the two of the table values extracted by the extracting portion and on the reflectance component calculated by the reflectance-component calculating portion, thereby determining the pixel value of the output image.

2. An image processing device comprising:
a reflectance-component calculating portion that calculates a reflectance component based both on a pixel value of a subject pixel in an original image and on an average luminance of peripheral pixels around the subject pixel, the reflectance component being indicative of brightness of the subject pixel relative to the peripheral pixels;
a pixel-value generating portion that generates a pixel value of an output image based both on the pixel value of the subject pixel and on a corrected value obtained by performing gamma correction on the pixel value of the subject pixel using the reflectance component; and
a storage portion that stores, in association with first pixel values, table values including either gamma-corrected values obtained by performing gamma correction on the first pixel values using a predetermined reflectance component or second pixel values calculated based both on the gamma-corrected values and on the first pixel values,
wherein the pixel-value generating portion comprising:
an extracting portion that extracts at least one of the table values corresponding to the pixel value of the subject pixel; and
a determining portion that determines the pixel value of the output image based on the at least one of the table values extracted by the extracting portion;
wherein the predetermined reflectance component is the reflectance component calculated by the reflectance-component calculating portion when the pixel value of the subject pixel is substantially identical with the average luminance of the peripheral pixels;
wherein the pixel-value generating portion further comprises:

a range setting portion that sets a range of normalization for the reflectance component calculated by the reflectance-component calculating portion, the range of normalization including a number of pixels greater than or equal to a predetermined ratio; and a normalizing portion that normalizes the reflectance component within the range of normalization based on conversion from the range of normalization set by the range setting portion to another range defined by predetermined upper and lower limits, thereby calculating a normalized reflectance component;

wherein the pixel-value generating portion generates the pixel value of the output image using the normalized reflectance component as the reflectance component; and wherein the predetermined reflectance component used for obtaining the gamma corrected values includes the normalized reflectance component within the another range.

3. The image processing device according to claim 2, wherein the predetermined reflectance component used for obtaining the gamma corrected values further includes the predetermined upper and lower limits defining the another range.

4. A computer-readable storage device storing a set of program instructions executable on an image processing device, the set of program instructions comprising:

calculating a reflectance component based both on a pixel value of a subject pixel in an original image and on an average luminance of peripheral pixels around the subject pixel, the reflectance component being indicative of brightness of the subject pixel relative to the peripheral pixels; and generating a pixel value of an output image based both on the pixel value of the subject pixel and on a corrected value obtained by performing gamma correction on the pixel value of the subject pixel using the reflectance component, the generating instructions comprising:

extracting at least one of table values corresponding to the pixel value of the subject pixel, the table values being stored in association with first pixel values in a storage portion, the table values including either gamma-corrected values obtained by performing gamma correction on the first pixel values using a predetermined reflectance component or second pixel values calculated based both on the gamma-corrected values and on the first pixel values; and determining the pixel value of the output image based on the at least one of the table values extracted by the extracting instructions, wherein the predetermined reflectance component is the reflectance component calculated by the calculating instructions when the pixel value of the subject pixel is substantially identical with the average luminance of the peripheral pixels;

wherein the predetermined reflectance component includes a plurality of predetermined reflectance components;

wherein the table values stored in the storage portion are calculated for each of the plurality of predetermined reflectance components;

wherein, when the reflectance component calculated by the calculating instructions equals to one of the plurality of predetermined reflectance components, one of the table values corresponding to the one of the plurality of predetermined reflectance components is extracted by the extracting instructions;

wherein, when the reflectance component calculated by the calculating instructions is different from any one of the plurality of predetermined reflectance components, two of the table values corresponding to respective ones of the plurality of predetermined reflectance components are extracted by the extracting instructions, the two of the table values surrounding the reflectance component calculated by the calculating instructions; and wherein the determining instructions include performing interpolation based both on the two of the table values extracted by the extracting instructions and on the reflectance component calculated by the calculating instructions, thereby determining the pixel value of the output image.

5. A computer-readable storage device storing a set of program instructions executable on an image processing device, the set of program instructions comprising:

calculating a reflectance component based both on a pixel value of a subject pixel in an original image and on an average luminance of peripheral pixels around the subject pixel, the reflectance component being indicative of brightness of the subject pixel relative to the peripheral pixels; and generating a pixel value of an output image based both on the pixel value of the subject pixel and on a corrected value obtained direction on the pixel value of the subject pixel using the reflectance component, the generating instructions comprising:

extracting at least one of table values corresponding to the pixel value of the subject pixel, the table values being stored in association with first pixel values in a storage portion, the table values including either gamma-corrected values obtained by performing gamma correction on the first pixel values using a predetermined reflectance component or second pixel values calculated based both on the gamma-corrected values and on the first pixel values; and determining the pixel value of the output image based on the at least one of the table values extracted by the extracting instructions, wherein the predetermined reflectance component is the reflectance component calculated by the calculating instructions when the pixel value of the subject pixel is substantially identical with the average luminance of the peripheral pixels;

wherein the generating instructions further comprise:

setting a range of normalization for the reflectance component calculated by the calculating instructions, the range of normalization including a number of pixels greater than or equal to a predetermined ratio; and normalizing the reflectance component within the range of normalization based on conversion from the range of normalization set by the setting instructions to another range defined by predetermined upper and lower limits, thereby calculating a normalized reflectance component;

wherein the generating instructions include generating the pixel value of the output image using the normalized reflectance component as the reflectance component; and wherein the predetermined reflectance component used for obtaining the gamma corrected values includes the normalized reflectance component within the another range.

6. The storage medium according to claim 5, wherein the predetermined reflectance component used for obtaining the gamma corrected values further includes the predetermined upper and lower limits defining the another range.

* * * * *